United States Patent [19]

Erickson et al.

[11] Patent Number: 5,001,901
[45] Date of Patent: Mar. 26, 1991

[54] HYDRAULIC FLUID CIRCUIT FOR FULL CASE HYDRAULIC UNIT

[75] Inventors: Randy D. Erickson; Ronald D. Kunkel, both of Rockford, Ill.

[73] Assignee: Sundstrand Corporation, Rockford, Ill.

[21] Appl. No.: 253,189

[22] Filed: Oct. 4, 1988

[51] Int. Cl.⁵ .................... F01M 1/02; F16H 39/04
[52] U.S. Cl. .................................. 60/336; 60/453; 60/488
[58] Field of Search .......................... 60/453–454, 60/456, 336, 912, 444, 488; 92/78–79, 144; 184/104.1; 165/47

[56] References Cited

U.S. PATENT DOCUMENTS

| | | | |
|---|---|---|---|
| 1,910,054 | 5/1933 | Rayburn | 60/453 X |
| 2,959,008 | 11/1960 | Caroli | 60/454 |
| 2,962,863 | 12/1960 | Caroli | 60/453 |
| 3,131,540 | 5/1964 | Ritter | |
| 3,230,699 | 1/1966 | Hann et al. | 60/444 |
| 3,411,297 | 11/1968 | Hann | 60/444 X |
| 3,522,704 | 8/1970 | Martin | |
| 3,585,797 | 6/1971 | Moon | 60/444 |
| 3,680,312 | 8/1972 | Forster | |
| 3,885,388 | 5/1975 | Crull | 60/444 |
| 4,173,867 | 11/1979 | Schmidt et al. | 60/456 |
| 4,215,546 | 8/1980 | Hager et al. | 60/456 |
| 4,617,797 | 10/1986 | Williams | 60/444 |
| 4,813,477 | 3/1989 | Hansen et al. | 184/104.1 X |

FOREIGN PATENT DOCUMENTS

2720710 11/1978 Fed. Rep. of Germany .
756084 8/1980 U.S.S.R. .

Primary Examiner—Edward K. Look
Assistant Examiner—George Kapsalas
Attorney, Agent, or Firm—Antonelli, Terry, Stout & Kraus

[57] ABSTRACT

An improved hydraulic apparatus is disclosed having a hydraulic device (14) receiving conditioned hydraulic fluid directly from an inlet port (62) in a case (12) full of hydraulic fluid (16) with the conditioned hydraulic fluid having a characteristic which is better than the characteristic of the fluid within the case. The characteristic may be that the hydraulic fluid is cooled to a temperature below the temperature of the hydraulic fluid within the case, is filtered, or is deaerated. Cooled hydraulic fluid is supplied from a heat exchanger (58) in fluid communication between an outlet port of the case and the inlet port of the case to supply the hydraulic fluid contained within the case. The hydraulic fluid is filtered by a filter (54) external to the case. A deaerator (65) may be located in a fluid circuit external to the case between a scavenge pump (50) and the inlet port (67). Hydraulic fluid is pumped by a charge pump (26) to the input port (72) of the hydraulic device. Fluid line (74) connects the inlet port of the case to an input port of a charge pump so that cooled hydraulic fluid flows directly from the inlet port to the input port of the charge pump. The charge pump has a steady state flow rate of pumping hydraulic fluid to the hydraulic device which is less than a steady state rate at which cooled and filtered hydraulic fluid is supplied to the inlet port of the case which causes excess cooled hydraulic fluid to enter the case from the fluid line through interior case port (80).

35 Claims, 2 Drawing Sheets

HYDRAULIC FLUID CIRCUIT FOR FULL CASE HYDRAULIC UNIT

BACKGROUND OF THE INVENTION

1. Field of the Invention

The present invention relates to hydraulic devices which are operated within a full case of hydraulic fluid. More specifically, the present invention relates to a hydraulic pump and hydraulic motor combination of a constant speed drive transmission which is operated in a case full of hydraulic fluid.

2. Description of the Prior Art

Figure 1:
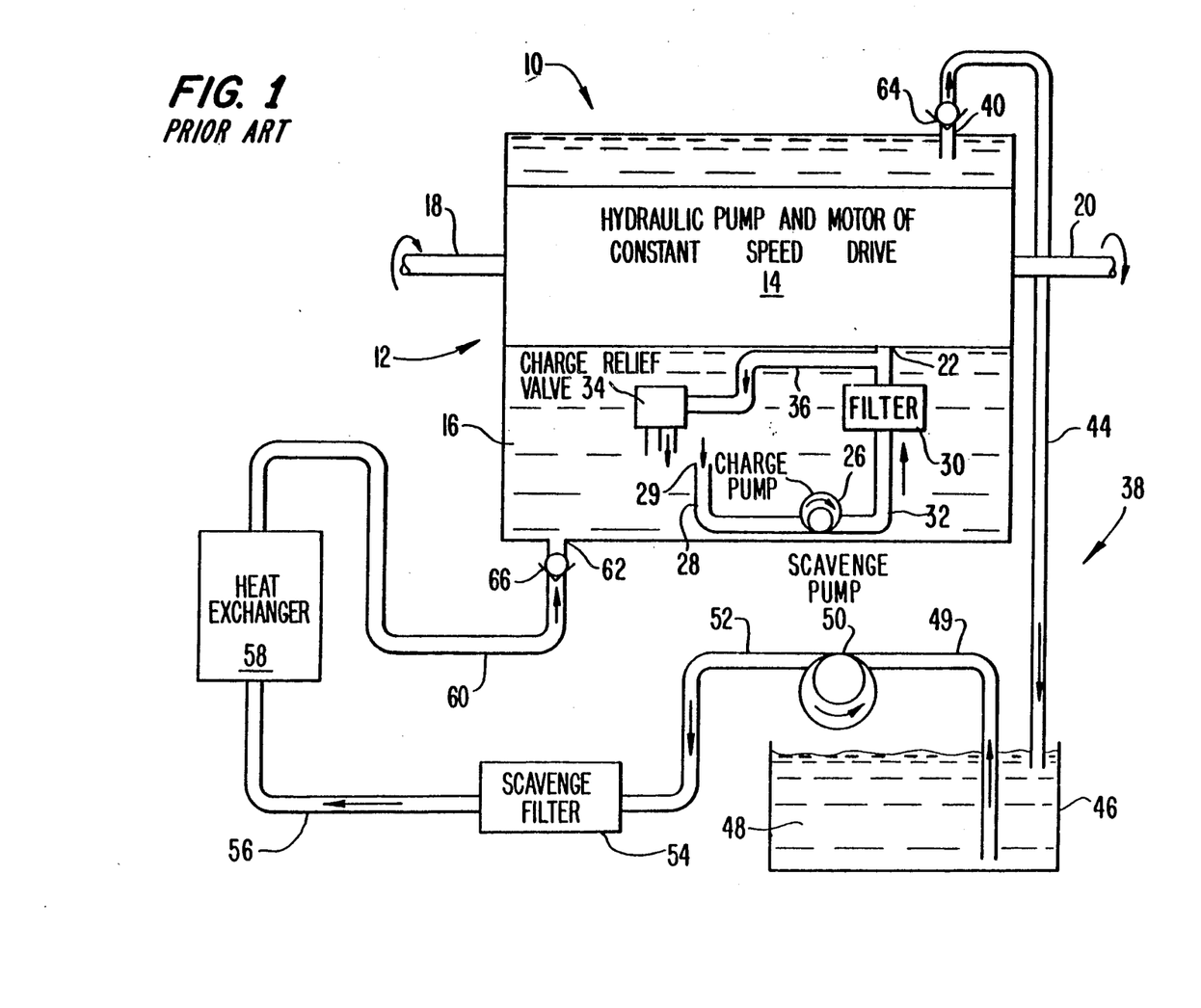
FIG. 1 illustrates a prior art hydraulic apparatus.

FIG. 1 illustrates a portion of a prior art constant speed drive 10 marketed by the assignee of the present invention. As is known, a constant speed drive transmission converts an input variable rotational shaft velocity from an input shaft coupled to an engine, such as an aircraft propulsion engine, to a constant rotational velocity shaft velocity on an output shaft. The output shaft drives a three-phase alternator (not illustrated) for producing constant frequency alternating current such as 400 Hz used in airframes. The illustrated portion 10 of the constant speed drive is known as a "full case" unit which has a case 12 in which is located a conventional hydraulic pump and hydraulic motor. The shaft 18 drives a conventional variable displacement hydraulic pump. The hydraulic pump functions to receive hydraulic oil from a charge pump 26, further pressurize the oil and apply the pressurized oil to the hydraulic motor. The charge pump 26 is illustrated schematically as being inside the case 12 but it should be understood that in practice the charge pump is external to the case with a conduit coupling oil from within the case to the charge pump outside the case with a conduit coupling the pressurized oil from the pump to the interior to the case to filter 30. The pressurized hydraulic fluid from the hydraulic pump drives a fixed displacement hydraulic motor. A control valve modulates the angle of a swash plate in the variable displacement hydraulic pump to vary pump displacement which controls the rotational velocity of the shaft 20. The conventional hydraulic pump and motor 14 are totally immersed within hydraulic fluid 16 during operation. The pump has an input port 22 which receives hydraulic fluid 16 which is pumped from the interior of the case 12. Hydraulic fluid is supplied to the input port 22 by charge pump 26 which receives oil from fluid line 28 which has an input port 29 in fluid communication with the hydraulic fluid 16 within the case 12. The opening of the input port in an intermediate position within the case 16 provides for fluid to be available to the hydraulic pump and motor 14 upon commencement of their operation. Pressurized oil which is outputted from the charge pump 26 is coupled to filter 30 by fluid line 32. The filter 30 is necessary to prevent any debris taken into the port 29 from the hydraulic fluid 16 from being pumped into the hydraulic pump and motor 14 which could cause substantial wear or damage. A charge relief valve 34 has a preset pressure which regulates the operating pressure of the hydraulic pump and motor 14 and discharges excess hydraulic fluid back into the full case 16. The charge relief valve 34 opens when the system operating pressure at the input port 22 rises above the threshold pressure of the valve to limit the system operating pressure. The charge relief valve 34 is connected to the input port 22 by fluid line 36. Leakage from the hydraulic pump and motor 14 flows back into the case to help contain fluid within the case along with fluid from the charge relief valve also within the case 12.

The contained external hydraulic fluid circuit 38 is described as follows. Hydraulic fluid circulates between outlet port 40 of the case 12 and inlet port 62 by flow through fluid line 44 into sump 46 where the hydraulic fluid 48 within the sump 46 is taken up by fluid line 49, pumped by scavenge pump 50 through fluid line 52 to scavenge filter 54, through fluid line 56 to heat exchanger 58 where the hydraulic fluid is cooled as the primary heat regulating mechanism for the hydraulic fluid 16 within the case 12 and finally flows through fluid line 60 to inlet port 62. Outlet port check valve 64 prevents the flow of hydraulic fluid from the case 12 in circumstances when the level of fluid in the case 12 is low. Inlet port check valve 66 also prevents the flow of hydraulic fluid 16 from the sump 12 back to the heat exchanger 58. The inlet port valve is spring biased into a closed position to prevent opening until a predetermined pressure is reached. However, the valve 66 does not prevent aspiration of gas by the charge pump 26.

The prior art full case unit 10 of FIG. 1 has several disadvantages. First, the hydraulic fluid supplied to the hydraulic pump and motor 14 is supplied generally from the hydraulic fluid 16 within the case 12. Because of the heat outputted by the hydraulic pump and motor 14 to the hydraulic fluid within the case 12, the temperature of the hydraulic fluid which is pumped by the charge pump 26 to the input port 22 of the hydraulic pump is at an elevated temperature which is the ambient temperature of the hydraulic fluid within the case. An elevated hydraulic fluid temperature reduces the service life of the hydraulic pump and motor 14 over that which would be achieved if the temperature of the hydraulic fluid inputted by the input port 22 were reduced. Second, as has been pointed out above, debris accumulates within the case 12 which if pumped into the hydraulic pump and motor 14 by the charge pump 26 could cause wear or premature failure which necessitates the use of a filter 30. The filter must be periodically replaced and further represents a weight penalty which in the preferred application of the present invention in the electrical power supply of an airframe is a disadvantage. Third, the rate of flow of hydraulic fluid through the external hydraulic fluid circuit including heat exchanger 58 must be sufficiently great to regulate the temperature of the oil within the full case 12. This necessitates the introduction of a sufficiently large quantity of cooled hydraulic fluid into the case 12 to bring down the temperature of the full case 12. The requisite flow rate to achieve the aforementioned cooling necessitates the use of a scavenge pump 50 having a relatively large flow rate with a concomitant weight penalty. The case 12 can be subject to leakage which lowers the level of hydraulic fluid in the case so that an interruption of the flow of fluid to the hydraulic pump and motor 14 is possible upon commencement of operation of the hydraulic pump and motor after long periods of inactivity. Any loss of hydraulic fluid to the hydraulic pump and motor 14 during initiation of operation can cause substantial damage.

SUMMARY OF THE INVENTION

The present invention provides an improved hydraulic apparatus which is immersed in a case full of hydraulic fluid. First, the invention lowers the temperature of hydraulic fluid supplied to the hydraulic apparatus which increases the life of the hydraulic apparatus. Second, the invention eliminates the prior art filter 30 disposed within the full case as described above which simplifies servicing and reduces the overall weight of the hydraulic apparatus. Third, as a consequence of lowering the temperature of the hydraulic fluid inputted to the hydraulic apparatus, the size of the scavenge pump 50 pumping hydraulic fluid between the outlet and inlet ports 62 and 64 of the case may be reduced from the prior art which relies upon a relatively larger flow of cooled oil being inputted from the heat exchanger 58 to the case 12 to regulate the overall temperature of the hydraulic apparatus. The application of hydraulic fluid directly from an external pump through a conduit connected to the pump within the case prevents the possibility that insufficient fluid will be provided to the hydraulic pump and motor 14 upon commencement of operation of the pump and motor after long periods of inactivity over which the level of hydraulic fluid may substantially leak down.

The invention conditions the fluid which is taken in by the charge pump 26 to a quality above that which is present in the case 12. The conditioning may be the aforementioned cooling, filtering to eliminate particulates within the hydraulic fluid to make the hydraulic fluid taken into the case cleaner than the hydraulic fluid within the case or deaerating to remove gas particles entrained in the hydraulic fluid.

A hydraulic apparatus in accordance with the invention includes a hydraulic fluid case having an inlet port and an outlet port with the case being full of hydraulic fluid during operation of the hydraulic apparatus; a hydraulic device disposed within the case which receives hydraulic fluid from an input port; a fluid communication circuit between the inlet and outlet ports for receiving hydraulic fluid from the outlet port, cooling the received hydraulic fluid to a temperature below a temperature of the received hydraulic fluid and supplying the cooled hydraulic fluid to the inlet port; and a first fluid line connecting the inlet port to a pump supplying pressurized hydraulic fluid to the input port of the hydraulic device, the pump pumping hydraulic fluid at a steady state flow rate less than a steady state flow rate at which hydraulic fluid is supplied from the fluid communication circuit to the case, the first fluid line having an interior case port opening into the case for permitting any excess rate of flow of cooled hydraulic fluid supplied to the inlet port by the fluid communication circuit greater than a rate of flow of hydraulic fluid pumped by the pump to enter into the case from the first fluid line through the interior case port and for permitting hydraulic fluid to be drawn from the case into the first fluid line through the interior case port for pumping by the pump when the rate of flow of hydraulic fluid supplied to the inlet port is less than the rate of flow of hydraulic fluid pumped by the charge pump. A relief valve is located in a second fluid line disposed between a high pressure discharge of the pump and the input port of the hydraulic device, the relief valve coupling the second fluid line to the case when hydraulic fluid pressure in the second fluid line exceeds a pressure rating of the charge relief valve. Furthermore, a check valve is provided in fluid communication with the flow of hydraulic fluid from the fluid communication circuit to the pump which is disposed between the fluid communication circuit and the interior case port for blocking the flow of hydraulic fluid from the case to the fluid communication circuit and permitting hydraulic fluid to flow into the inlet port from the fluid communication circuit. The check valve is biased closed until the pressure of the hydraulic fluid flowing into the case exceeds a predetermined pressure limit to prevent the aspiration of air by the pump. A check valve is provided in fluid communication with the flow of hydraulic fluid from the outlet port for blocking the flow of hydraulic fluid from the outlet port to the fluid communication circuit during an interruption of hydraulic fluid to the case. The check valve coupled to the inlet port is disposed in a fluid line external to the case which connects the fluid communication circuit to the inlet port; and the check valve coupled to the outlet port is disposed in fluid line external to the case which is connected to an external sump in fluid communication with the heat exchanger. A scavenge pump is provided in fluid communication with the sump for pumping hydraulic fluid from the sump to a heat exchanger within the fluid communication circuit. A filter is located in a fluid line connecting the scavenge pump to the heat exchanger. A preferred implementation of the hydraulic device of the present invention is a hydraulic pump and motor of a constant speed drive transmission used for driving an electrical generator in an airframe.

In a hydraulic apparatus having a hydraulic device, immersed within hydraulic fluid contained in a case full of hydraulic fluid, receiving hydraulic fluid from an input port, and discharging hydraulic fluid into the case to which hydraulic fluid is supplied from a fluid communication circuit between an outlet port of the case and an inlet port of the case to supply the hydraulic fluid contained within the case and in which hydraulic fluid is pumped from a pump to an input port of the hydraulic device, an improvement in accordance with the invention comprises a fluid line connecting the inlet port of the case to an input port of the pump to cause cooled hydraulic fluid with respect to the temperature of hydraulic fluid in the case to flow directly from the inlet port to the input port of the charge pump; and wherein the pump has a steady state flow rate of pumping hydraulic fluid to the hydraulic device which is less than a steady state flow rate at which cooled hydraulic fluid is supplied to the inlet port of the case. Furthermore, an interior case port within the fluid line connecting the inlet port of the case to the input port of the pump is provided for discharging hydraulic fluid into the case from the fluid line and for taking hydraulic fluid into the fluid line for pumping by the pump to the hydraulic device. Any excess in flow rate of cooled hydraulic fluid supplied to the inlet port of the case by the fluid communication circuit greater than the flow rate of hydraulic fluid pumped by the charge pump enters the case from the fluid line through the interior case port and any deficiency in flow rate of cooled hydraulic fluid supplied to the inlet port of the case by the fluid communication circuit less than the flow rate of hydraulic fluid pumped by the pump enters the fluid line through the interior case port. Furthermore, the invention includes a fluid line connecting the outlet port of the case to a hydraulic fluid sump; and a pump for pumping hydraulic fluid from the sump to a filter which is coupled to the inlet port. Preferably, the hydraulic device is a hydraulic pump and motor within a constant speed drive transmission having a variable speed input shaft and a constant speed output shaft for driving an electrical generator in an airframe.

A hydraulic apparatus in accordance with the invention includes a hydraulic device receiving hydraulic fluid from an input port and discharging hydraulic fluid; a case containing the hydraulic device and being operated with the case full of hydraulic fluid; an inlet port in the case for supplying cooled hydraulic fluid with respect to the temperature of hydraulic fluid in the case; a pump which supplies pressurized hydraulic fluid to the device; a fluid line connecting the inlet port of the case to an input port of the pump to cause cooled hydraulic fluid to flow directly from the inlet port to the input port of the pump; and wherein the pump has a steady state flow rate of pumping hydraulic fluid to the hydraulic device which is less then a steady state flow rate at which cooled hydraulic fluid is supplied to the inlet port of the case. An interior case port is within the fluid line connecting the inlet port of the case to the input port of the pump for discharging hydraulic fluid into the case from the fluid line and for taking hydraulic fluid into the fluid line for pumping by the pump to the hydraulic device. Any excess in flow rate of cooled hydraulic fluid supplied to the inlet port of the case enters the case from the fluid line through the interior case port and any deficiency in flow rate of cooled hydraulic fluid supplied to the inlet port of the case less than the flow rate of hydraulic fluid pumped by the pump enters the fluid line through the interior case port. A fluid line connects the outlet port of the case to a hydraulic fluid sump; and a pump pumps hydraulic fluid from the sump to the filter which is connected to the inlet port.

A hydraulic system having a hydraulic device which is operated within a case that is full of hydraulic fluid in accordance with the invention includes an inlet port in the case for receiving hydraulic fluid having a temperature lower than the temperature of hydraulic fluid within the case; a fluid line connecting the inlet port of the case to an input port of a pump to cause hydraulic fluid to flow directly from the inlet port to the input port of the pump which pumps hydraulic fluid to the hydraulic device, the pump having a steady state flow rate of pumping hydraulic fluid to the device which is less than a steady state flow rate at which the hydraulic fluid having a temperature lower than the hydraulic fluid within the case is supplied to the input port of the case from a fluid communication circuit; a pump for supplying pressurized hydraulic fluid to the fluid communication circuit; and a filter disposed within the fluid communication circuit between the pump for supplying pressurized hydraulic fluid and the inlet port for filtering the pressurized hydraulic fluid supplied to the inlet port. An interior case port is provided within the line connecting the inlet port of the case to the input port of the pump for discharging hydraulic fluid into the case from the fluid line and for taking hydraulic fluid into the fluid line for pumping by the pump to the hydraulic device. A relief valve is located in a second fluid line disposed between a high pressure discharge of the pump and the input port of the hydraulic device, the relief valve coupling the second fluid line to the case when hydraulic fluid pressure in the second fluid line exceeds a pressure rating of the charge relief valve.

A hydraulic apparatus in accordance with the invention includes a hydraulic fluid case having an inlet port and an outlet port with the case being full of hydraulic fluid during operation of the hydraulic apparatus; a hydraulic device within the case which receives hydraulic fluid from an input port; a fluid communication circuit between the inlet and outlet ports for receiving hydraulic fluid from the outlet port, conditioning the received hydraulic fluid to improve a characteristic of the fluid to be better than the characteristic of the fluid in the case and supplying the conditioned hydraulic fluid to the inlet port; and a first fluid line connecting the inlet port to a pump supplying pressurized hydraulic fluid to the inlet port of the hydraulic device, the pump pumping hydraulic fluid at a flow rate less than a steady state flow rate at which hydraulic fluid is supplied from the fluid communications circuit to the inlet port, the first fluid line having an interior case port opening into the case for permitting any excess rate of flow of conditioned hydraulic fluid supplied to the inlet port by the fluid communication circuit greater than a rate of flow of hydraulic fluid pumped by the pump to enter into the case from the fluid line through the interior case port and for permitting hydraulic fluid to be drawn from the case into the fluid line through the interior case port for pumping by the pump when the rate of flow of hydraulic fluid supplied to the inlet port is less than the rate of flow of hydraulic fluid pumped by the pump. The conditioned fluid may be filtered by a filter disposed outside the case. Alternatively, the conditioned fluid may be deaerated by a deaerator disposed outside the case. Furthermore, a check valve is disposed in fluid communication with the flow of hydraulic fluid from the fluid communication circuit to the pump for blocking the flow of hydraulic fluid from the case to the fluid communications circuit during an interruption of hydraulic fluid flow to the case and permitting hydraulic fluid to flow into the inlet port from the fluid communication circuit, the check valve being biased closed until pressure of the fluid flowing into the case exceeds a predetermined pressure limit to prevent aspiration of gas by the pump from the fluid communication circuit.

In a hydraulic apparatus having a hydraulic device receiving hydraulic fluid from an input port and discharging hydraulic fluid into a case full of hydraulic fluid in which conditioned hydraulic fluid is supplied from a fluid communication circuit in fluid communication between an outlet port of the case and an inlet port of the case to supply hydraulic fluid contained within the case and in which hydraulic fluid is pumped by a pump to the input port of the hydraulic device, an improvement in accordance with the invention includes a fluid line connecting the inlet port of the case to the input port of the pump to cause conditioned hydraulic fluid to flow directly from the inlet port to the input port of the pump to improve a characteristic of the fluid to be better than the characteristic of the fluid in the case; and wherein the pump has a steady state flow rate of pumping hydraulic fluid to the hydraulic device which is less than a steady state flow rate at which conditioned hydraulic fluid is supplied to the inlet port of the case. The conditioned hydraulic fluid may be filtered by a filter disposed outside the case. Alternatively, the conditioned hydraulic fluid may be deaerated by a deaerator disposed outside the case. A check valve is disposed in fluid communication with the flow of hydraulic fluid from the fluid communication circuit to the pump for blocking the flow of hydraulic fluid from the case to the fluid communication circuit during an interruption of hydraulic fluid flow to the case and permitting hydraulic fluid to flow into the inlet port from the fluid communications circuit, the check valve being biased closed until pressure of the hydraulic fluid flowing into the case exceeds a predetermined pressure limit to prevent aspiration of gas by the pump from the fluid communications circuit.

A hydraulic apparatus in accordance with the invention includes a hydraulic device receiving hydraulic fluid from an input port and discharging hydraulic fluid; a case containing the hydraulic device and being operated with the case full of hydraulic fluid; an inlet port in the case for supplying conditioned hydraulic fluid to improve a characteristic of the fluid to be better than the characteristic of the fluid in the case; a pump contained within the case which supplies pressurized hydraulic fluid to the device; a fluid line connecting the inlet port of the case to an input port of the pump to cause conditioned hydraulic fluid to flow directly from the inlet port to the input port of the pump; and wherein the pump has a steady state flow rate of pumping hydraulic fluid to the hydraulic device which is less than the steady state flow rate at which conditioned hydraulic fluid is supplied to the inlet port of the case. The conditioned hydraulic fluid may be filtered by a filter disposed outside the case. Alternatively, the conditioned hydraulic fluid may be deaerated by a deaerator disposed outside the case. A check valve is disposed in fluid communication with the flow of hydraulic fluid from the fluid communication circuit to the pump for blocking the flow of hydraulic fluid from the case to the fluid communication circuit during interruption of hydraulic fluid flow to the case and permitting hydraulic fluid to flow into the inlet port from the fluid communication circuit, the check valve being biased closed until the pressure of the hydraulic fluid flowing into the case exceeds a predetermined pressure limit to prevent aspiration of gas by the pump from the fluid communication circuit.

A hydraulic system having a hydraulic device which is operated within a case that is full of hydraulic fluid in accordance with the invention includes an inlet port in the case for receiving conditioned hydraulic fluid to improve a characteristic of the fluid to be better than the characteristic of the fluid in the case; a fluid line connecting the inlet port of the case to the input port of the pump within the case to cause hydraulic fluid to flow directly from the inlet port to the input port of the pump which pumps conditioned hydraulic fluid to the hydraulic device, the pump having a steady state flow rate of pumping hydraulic fluid to the device which is less than a steady state flow rate at which conditioned hydraulic fluid is supplied to the inlet port of the case from a fluid communication circuit; a pump for supplying pressurized hydraulic fluid to the fluid communication circuit; and a filter disposed within the fluid communication circuit between the pump for supplying pressurized hydraulic fluid and the inlet port for filtering the pressurized fluid supplied to the inlet port. The conditioned fluid may be deaerated by a deaerator disposed outside the case. A check valve is disposed in fluid communication with the flow of hydraulic fluid from the fluid communication circuit to the pump for blocking the flow of hydraulic fluid from the case to the fluid communication circuit during interruption of the hydraulic fluid flow to the case and permitting hydraulic fluid to flow into the inlet port from the fluid communication circuit, the check valve being biased closed until pressure of the hydraulic fluid flowing into the case exceeds a predetermined pressure limit to prevent aspiration of gas by the pump from the fluid communication circuit.

DETAILED DESCRIPTION OF THE PREFERRED EMBODIMENT

Figure 2:
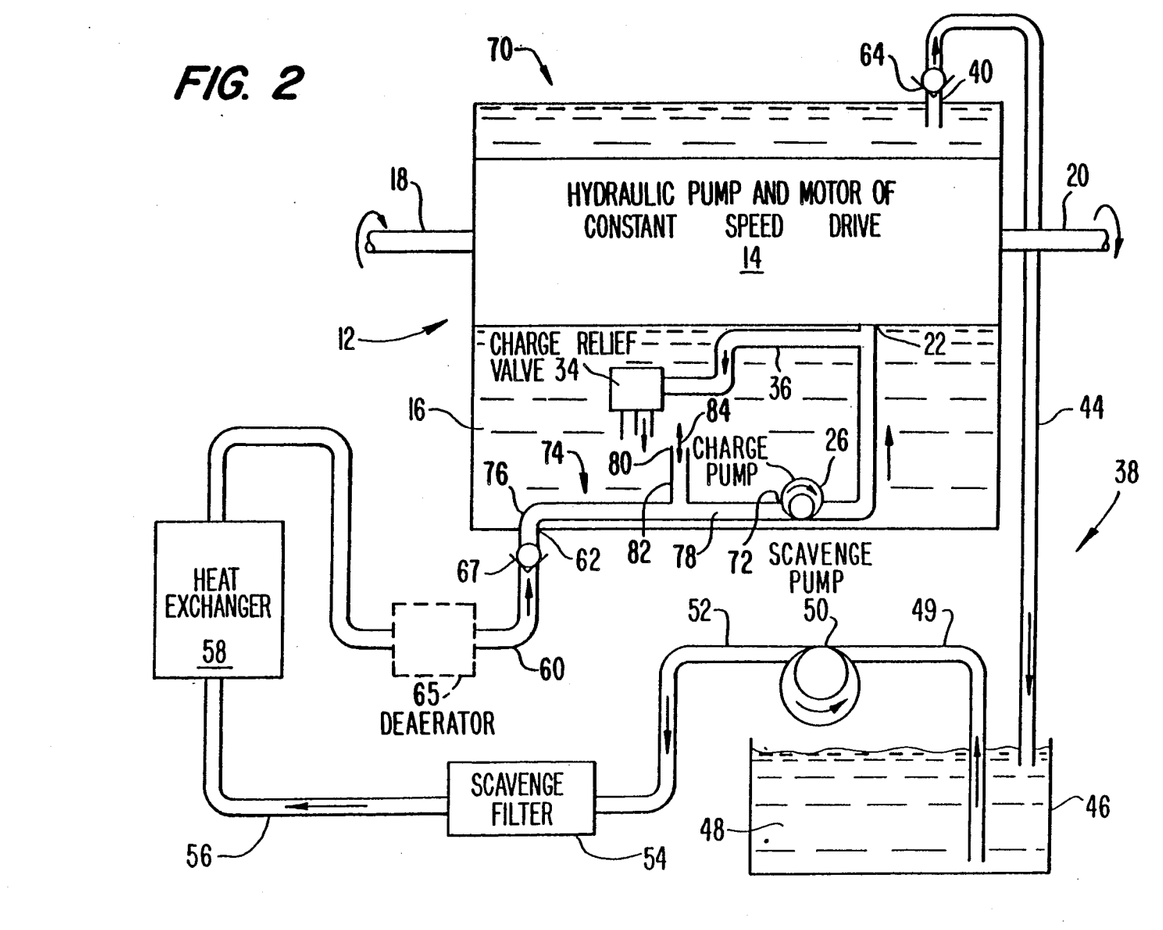
FIG. 2 illustrates an embodiment of the present invention.

FIG. 2 illustrates an embodiment 70 of the present invention which is preferably used within a constant speed drive transmission driving a three-phase alternator within an airframe. Conventional structures of a constant speed drive transmission within an airframe have been omitted for the reason they are not necessary to understand the invention. Like reference numerals identify like parts in FIGS. 1 and 2. Parts discussed with reference to FIG. 1 will not be discussed with regard to FIG. 2 except to the extent to highlight salient points of the present invention. Check valve 67 blocks the flow of hydraulic fluid from the case 12 to the fluid communication circuit supplying fluid to the case and permits hydraulic fluid to flow into the inlet port 62 from the fluid communication circuit with the valve being biased closed until the pressure of the fluid flowing into the case exceeds a predetermined pressure limit to prevent aspiration of gas by the charge pump 26. Cooled hydraulic fluid from the heat exchanger 58 flows directly to the input port 72 of charge pump 26 through fluid line 74. The scavenge filter 54 conditions the hydraulic fluid to remove entrained particles to clean the fluid to be cleaner than the fluid 16 in the case which over a period of use can become contaminated with particulate material which could damage the hydraulic pump and motor. An optional deaerator 65 may be added to condition the fluid which is received on the charge pump 26 to remove air gas entrained in the hydraulic fluid. The position of the deaerator 65 may be anywhere downstream from the scavenge pump 50. While a discrete heat exchanger 58 has been illustrated, it should be understood that any mechanism for cooling the hydraulic fluid flowing from the case within the external, hydraulic fluid circuit 38 may be used including, but not limited to, reliance on heat transferred from the surfaces of the fluid lines of the external hydraulic fluid circuit instead of a discrete heat exchanger. The fluid line 74 has a first end 76 in fluid communication with the inlet check valve 66 and a second end 78 connected to the input port 72. Furthermore, the fluid line 74 has an interior case port 80 which connects the fluid line 74 to the interior of the case 12. As illustrated, the case port 80 is contained at the end of a vertical section of fluid line 82 which is connected to the fluid line 74. Displacement of the interior case port 80 above the bottom of the case 12 insures that fluid will be present at the internal case port upon activation of the hydraulic pump and motor 14.

Bidirectional arrow 84 indicates the two conditions of hydraulic fluid flow which may occur with the present invention. During normal operation when cooled hydraulic fluid is flowing from the heat exchanger 58 into the line 74, the charge pump 26 is operated such that its pumping rate of hydraulic fluid to the input port 22 of the hydraulic pump and motor 14 is less than the rate of flow of cooled hydraulic fluid through the inlet port 62. As a consequence of the greater rate of flow of cooled hydraulic fluid through the inlet port 62 than the rate of flow of hydraulic fluid being pumped by the charge pump 26, the excess rate of flow of hydraulic fluid above the rate of flow of hydraulic fluid pumped by the charge pump 26 is discharged into the hydraulic fluid 16 within the case 12. In the second mode of operation when the rate of flow of hydraulic fluid through the inlet port 62 is less than the rate of hydraulic fluid pumped by the charge pump 26 to the input port 22 of the hydraulic pump, the deficiency of hydraulic fluid which is pumped by the charge pump is made up by hydraulic fluid taken in from the hydraulic fluid 16 through interior case port 80. The check valve 67 being biased closed prevents the charge pump 26 from aspirating air when fluid flow is cut off through the inlet port 62. The foregoing deficiency in the rate of flow of hydraulic fluid through the port 62 can occur during rapid attitude changes of an aircraft which, without the taking in of hydraulic fluid through the interior case port 80 would result in interruption of pressurized hydraulic fluid to the hydraulic pump and motor 14 which cannot withstand an interruption of hydraulic fluid. Thus, the invention insures that at all times the requisite flow rate of hydraulic fluid is provided to the input port 22 of the hydraulic pump and during steady state operation further insures that the temperature of the hydraulic fluid at the input port 22 is lower than that of the hydraulic fluid 16 contained within the case 12 to lengthen the life of components within the hydraulic pump and motor 14. Furthermore, as a consequence of hydraulic fluid applied to the input of the charge pump 26 coming directly from the scavenge filter 54 through the heat exchanger 58, the filter 30 in the prior art of FIG. 1 is unnecessary to further protect the components of the hydraulic pump and motor 14 from having entrained debris contained in the hydraulic fluid supplied thereto.

While the present invention has been described in terms of its preferred embodiment, numerous modifications may be made thereto without departing from the spirit and scope of the invention. For example, while the preferred implementation of the invention is within a constant speed drive transmission utilized for generating electrical power in an airframe, the present invention is not limited thereto. Furthermore, it should be understood that while cooling and filtering of the hydraulic fluid is the preferred form of conditioning of fluid flowing into the case 12 through the inlet port, each of the disclosed modes of conditioning may be used independently. It is intended that all such modifications fall within the scope of the appended claims.

We claim:

1. A hydraulic apparatus comprising:
    a hydraulic fluid case having an inlet port and an outlet port with the case being full of hydraulic fluid during operation of the hydraulic apparatus;
    a hydraulic device within the case which receives hydraulic fluid from an input port;
    a fluid communication circuit between the inlet and outlet ports for receiving hydraulic fluid from the outlet port, cooling the received hydraulic fluid to a temperature below a temperature of the received hydraulic fluid, and supplying the cooled hydraulic fluid to the inlet port; and
    a first fluid line connecting the inlet port to a pump supplying pressurized hydraulic fluid to the input port of the hydraulic device, the pump pumping hydraulic fluid at a flow rate less than a steady state flow rate at which hydraulic fluid is supplied from the fluid communication circuit to the case, the first fluid line having an interior case port opening into the case for permitting any excess rate of flow of cooled hydraulic fluid supplied to the inlet port by the fluid communication circuit greater than a rate of flow of hydraulic fluid pumped by the pump to enter into the case from the fluid line through the interior case port and for permitting hydraulic fluid to be drawn from the case into the fluid line through the interior case port for pumping by the pump when the rate of flow of hydraulic fluid supplied to the inlet port is less than the rate of flow of hydraulic fluid pumped by the pump.

2. A hydraulic apparatus in accordance with claim 1 further comprising:
    a relief valve located in a second fluid line disposed between a high pressure discharge of the pump and the input port of the hydraulic device, the relief valve coupling the second fluid line to the case when hydraulic fluid pressure in the second fluid line exceeds a pressure rating of the charge relief valve.

3. A hydraulic apparatus in accordance with claim 2 further comprising:
    a check valve in fluid communication with the flow of hydraulic fluid from the fluid communication circuit to the pump which is disposed between the fluid communication circuit and the interior case port for blocking the flow of hydraulic fluid from the case to the fluid communication circuit during an interruption of hydraulic fluid flow to the case and permitting hydraulic fluid to flow into the inlet port from the fluid communication circuit; the check valve being biased closed until pressure of the fluid flowing into the case exceeds a predetermined pressure limit to prevent aspiration of gas by the pump from the fluid communication circuit; and
    a check valve in fluid communication with the flow of hydraulic fluid from the outlet port to the fluid communication circuit for blocking the flow of hydraulic fluid from the outlet port to the fluid communication circuit during an interruption of hydraulic fluid flow to the case.

4. A hydraulic apparatus in accordance with claim 3 wherein:
    the check valve coupled to the inlet port is disposed in the fluid communication circuit external to the case; and
    the check valve coupled to the outlet port is disposed in the fluid communication circuit external to the case.

5. A hydraulic apparatus in accordance with claim 4 further comprising:
    a pump in fluid communication with an external sump for pumping hydraulic fluid from the sump to a heat exchanger disposed in the fluid circuit.

6. A hydraulic apparatus in accordance with claim 5 further comprising:
    a filter disposed in a fluid line connecting the pump in fluid communication with the external sump to the heat exchanger.

7. A hydraulic apparatus in accordance with claim 1 wherein:
    the hydraulic device is part of a constant speed drive for driving an electrical generator in an airframe.

8. In a hydraulic apparatus having a hydraulic device receiving hydraulic fluid from an input port and discharging hydraulic fluid into a case full of the hydraulic fluid in which cooled hydraulic fluid is supplied from a fluid communication circuit in fluid communication between an outlet port of the case and an inlet port of the case to supply the hydraulic fluid contained within the case and in which hydraulic fluid is pumped by a pump to the input port of the hydraulic device, the improvement comprising:
- a fluid line connecting the inlet port of the case to an input port of the pump to cause cooled hydraulic fluid to flow directly from the inlet port to the input port of the pump; and wherein:
- the pump has a steady state flow rate of pumping hydraulic fluid to the hydraulic device which is less than a steady state flow rate at which cooled hydraulic fluid is supplied to the inlet port of the case.

9. A hydraulic apparatus in accordance with claim 8 further comprising:
- an interior case port within the fluid line connecting the inlet port of the case to the input port of the pump for discharging hydraulic fluid into the case from the fluid line and for taking hydraulic fluid into the fluid line for pumping by the pump to the hydraulic device.

10. A hydraulic apparatus in accordance with claim 9 wherein:
- any excess in flow rate of cooled hydraulic fluid supplied to the inlet port of the case by the fluid communication circuit greater than a flow rate of hydraulic fluid pumped by the pump enters the case from the fluid line through the interior case port and any deficiency in flow rate of cooled hydraulic fluid supplied to the inlet port of the case by the fluid communication circuit less than the flow rate of hydraulic fluid pumped by the pump enters the fluid line through the interior case port.

11. A hydraulic apparatus in accordance with claim 10 further comprising:
- a fluid line connecting the outlet port of the case to a hydraulic fluid sump; and
- a pump for pumping hydraulic fluid from the sump to a filter which is coupled to the inlet port.

12. A hydraulic apparatus in accordance with claim 8 wherein:
- the hydraulic device is part of a constant speed drive transmission having a variable speed input shaft and a constant speed output shaft for driving an electrical generator in an airframe.

13. A hydraulic apparatus in accordance with claim 8 wherein:
- a filter is disposed in the fluid communication circuit.

14. A hydraulic apparatus comprising:
- a hydraulic device receiving hydraulic fluid from an input port and discharging hydraulic fluid;
- a case containing the hydraulic device and being operated with the case full of the hydraulic fluid;
- an inlet port in the case for supplying cooled hydraulic fluid;
- a pump contained within the case which is immersed in hydraulic fluid during operation of the hydraulic device which supplies pressurized hydraulic fluid to the device;
- a fluid line connecting the inlet port of the case to an input port of the pump to cause cooled hydraulic fluid to flow directly from the inlet port to the input port of the pump; and wherein
- the pump has a steady state flow rate of pumping hydraulic fluid to the hydraulic device which is less than a steady state flow rate at which cooled hydraulic fluid is supplied to the inlet port of the case.

15. A hydraulic apparatus in accordance with claim 1 further comprising:
- an interior case port within the fluid line connecting the inlet port of the case to the input port of the pump for discharging hydraulic fluid into the case from the fluid line and for taking hydraulic fluid into the fluid line for pumping by the pump to the hydraulic device.

16. A hydraulic apparatus in accordance with claim 15 wherein:
- any excess in flow rate of cooled hydraulic fluid supplied to the inlet port of the case enters the case from the fluid line through the interior case port and any deficiency in flow rate of cooled hydraulic fluid supplied to the inlet port of the case less than the flow rate of hydraulic fluid pumped by the pump enters the fluid line through the interior case port.

17. A hydraulic apparatus in accordance with claim 16 further comprising:
- a fluid line connecting the outlet port of the case to a hydraulic fluid sump; and
- a pump for pumping hydraulic fluid from the sump to a filter which is coupled to the inlet port.

18. A hydraulic system having a hydraulic device which is operated within a case that is full of hydraulic fluid comprising:
- an inlet port in the case for receiving hydraulic fluid having a temperature lower than hydraulic fluid within the case;
- a fluid line connecting the inlet port of the case to an input port of a pump within the case to cause hydraulic fluid to flow directly from the inlet port to the input port of the pump which pumps hydraulic fluid to the hydraulic device, the pump having a steady state flow rate of pumping hydraulic fluid to the device which is less than a steady state flow rate at which cooled hydraulic fluid is supplied to the inlet port of the case from a fluid communication circuit;
- a pump for supplying pressurized hydraulic fluid to the fluid communication circuit; and
- a filter disposed within the fluid communication circuit between the pump for supplying pressurized hydraulic fluid and the inlet port for filtering the pressurized hydraulic fluid supplied to the inlet port.

19. A hydraulic system in accordance with claim 18 comprising:
- an interior case port within the fluid line connecting the inlet port of the case to the input port of the pump for discharging hydraulic fluid into the case from the fluid line and for taking hydraulic fluid into the fluid line for pumping by the pump to the hydraulic device.

20. A hydraulic system in accordance with claim 19 further comprising:
- a relief valve located in a second fluid line disposed between a high pressure discharge of the pump and an input port of the hydraulic device, the relief valve coupling the second fluid line/to the case when hydraulic fluid pressure in the second fluid line exceeds a pressure rating of the charge relief valve.

21. A hydraulic apparatus comprising:
- a hydraulic fluid case having an inlet port and an outlet port with the case being full of hydraulic fluid during operation of the hydraulic apparatus;
- a hydraulic device within the case which receives hydraulic fluid from an input port;
- a fluid communication circuit between the inlet and outlet ports for receiving hydraulic fluid from the outlet port, conditioning the received hydraulic fluid to improve a/ characteristic of the fluid to be better than the characteristic of the fluid in the case and supplying the conditioned hydraulic fluid to the inlet port; and a first fluid line connecting the inlet port to a pump supplying pressurized hydraulic fluid to the input port of the hydraulic device, the pump pumping hydraulic fluid at a flow rate less than a steady state flow rate at which hydraulic fluid is supplied from the fluid communication circuit to the inlet port, the first fluid line having an interior case port opening into the case for any excess rate of flow of conditioned hydraulic fluid supplied to the inlet port by the fluid communication circuit greater than a rate of flow of hydraulic fluid pumped by the pump to enter into the case from the fluid line through the interior case port and for permitting hydraulic fluid to be drawn from the case into the fluid line through the interior case port for pumping by the pump when the rate of flow of hydraulic fluid supplied to the inlet port is less than the rate of flow of hydraulic fluid pumped by the pump.

22. A hydraulic apparatus in accordance with claim 21 wherein:

the conditioned hydraulic fluid has been filtered by a filter disposed outside the case.

23. A hydraulic apparatus in accordance with claim 21 wherein:

the conditioned hydraulic fluid has been deaerated by a deaerator disposed outside the case.

24. A hydraulic apparatus in accordance with claim 21 further comprising:

a check valve in fluid communication with the flow of hydraulic fluid from the fluid communication circuit to the pump for blocking the flow of hydraulic fluid from the case to the fluid communication circuit during an interruption of hydraulic fluid flow to the case and permitting hydraulic fluid to flow into the inlet port from the fluid communication circuit, the check valve being biased closed until pressure of the hydraulic fluid flowing into the case exceeds a predetermined pressure limit to prevent aspiration of gas by the pump from the fluid communication circuit.

25. In a hydraulic apparatus having a hydraulic device receiving hydraulic fluid from an input port of the hydraulic device and discharging hydraulic fluid into a case full of the hydraulic fluid in which conditioned hydraulic fluid is supplied from a fluid communication circuit in fluid communication between an outlet port of the case and an inlet port of the case to supply the hydraulic fluid contained within the case and in which hydraulic fluid is pumped by a pump to the input port of the hydraulic device, the improvement comprising:

a fluid line connecting the inlet port of the case to an input port of the pump to cause conditioned hydraulic fluid to flow directly from the inlet port to the input port of the pump to improve a characteristic of the fluid to be better than the characteristic of the fluid in the case; and wherein the pump has a steady state flow rate of pumping hydraulic fluid to the hydraulic device which is less than a steady state flow rate at which conditioned hydraulic fluid is supplied to the inlet port of the case.

26. A hydraulic apparatus in accordance with claim 25 wherein:

a check valve in fluid communication with the flow of hydraulic fluid from the fluid communication circuit to the pump for blocking the flow of hydraulic fluid from the case to the fluid communication circuit during an interruption of hydraulic fluid flow to the case and permitting hydraulic fluid to flow into the inlet port from the fluid communication circuit, the check valve being biased closed until pressure of the hydraulic fluid flowing into the case exceeds a predetermined pressure limit to prevent aspiration of gas by the pump from the fluid communication circuit.

27. A hydraulic apparatus in accordance with claim 25 wherein:

the conditioned hydraulic fluid has been filtered by a filter disposed outside the case.

28. A hydraulic apparatus in accordance with claim 25 further comprising:

the conditioned hydraulic fluid has been deaerated by a deaerator disposed outside the case.

29. A hydraulic apparatus comprising:

a hydraulic device receiving hydraulic fluid from an input port and discharging hydraulic fluid;

a case containing the hydraulic device and the apparatus fluid; being operated with the case full of the hydraulic an inlet port in the case for supplying conditioned hydraulic fluid to improve a characteristic of the fluid to be better than the characteristic of the fluid in the case;

a pump which supplies pressurized hydraulic fluid to the device;

a fluid line connecting the inlet port of the case to an input port of the pump to cause conditioned hydraulic fluid to flow directly from the inlet port to the input port of the pump; and wherein the pump has a steady state flow rate of pumping hydraulic fluid to the hydraulic device which is less than a steady state flow rate at which conditioned hydraulic fluid is supplied to the inlet port of the case.

30. A hydraulic apparatus in accordance with claim 29 wherein:

a check valve in fluid communication with the flow of hydraulic fluid from the fluid communication circuit to the pump for blocking the flow of hydraulic fluid from the case to the fluid communication circuit during an interruption of hydraulic fluid flow to the case and permitting hydraulic fluid to flow into the inlet port from the fluid communication circuit, the check valve being biased closed until pressure of the hydraulic fluid flowing into the case exceeds a predetermined pressure limit to prevent aspiration of gas by the pump from the fluid communication circuit.

31. A hydraulic apparatus in accordance with claim 29 wherein:

the conditioned hydraulic fluid has been filtered by a filter disposed outside the case.

32. A hydraulic apparatus in accordance with claim 29 further comprising:

the conditioned hydraulic fluid has been deaerated by a deaerator disposed outside the case.

33. A hydraulic system having a hydraulic device which is operated within a case that is full of hydraulic fluid comprising:

an inlet port in the case for receiving conditioned hydraulic fluid to improve a characteristic of the fluid to be better than the characteristic of the fluid in the case;

a fluid line connecting the inlet port of the case to an input port of a pump within the case to cause hydraulic fluid to flow directly from the inlet port to the input port of the pump which pumps conditioned hydraulic fluid to the hydraulic device, the pump having a steady state flow rate of pumping hydraulic fluid to the device which is less than a steady state flow rate at which conditioned hydraulic fluid is supplied to the inlet port of the case from a fluid communication circuit;

a pump for supplying pressurized hydraulic fluid to the fluid communication circuit; and a filter disposed within the fluid communication circuit between the pump for supplying pressurized hydraulic fluid and the inlet port for filtering the pressurized hydraulic fluid supplied to the inlet port.

34. A hydraulic system in accordance with claim 33 wherein:

the conditioned hydraulic fluid has been deaerated by a deaerator disposed outside the case.

35. A hydraulic system in accordance with claim 33 further comprising:

a check valve in fluid communication with the flow of hydraulic fluid form the fluid communication circuit to the pump for blocking the flow of hydraulic fluid from the case to the fluid communication circuit during an interruption of hydraulic fluid flow to the case and permitting hydraulic fluid to flow into the inlet port from the fluid communication circuit, the check valve being biased closed until pressure of the hydraulic fluid flowing into the case exceeds a predetermined pressure limit to prevent aspiration of gas by the pump from the fluid communication circuit.

* * * * *